United States Patent [19]

Epelman-Wang et al.

[11] Patent Number: 5,737,554
[45] Date of Patent: Apr. 7, 1998

[54] SYSTEM AND METHOD OF USING OBJECT SENSITIVITY FOR SELECTING COMPUTER-GENERATED OBJECTS

[75] Inventors: Hernan Epelman-Wang, Cupertino; Ruben Kleiman, Redwood City; David Patrick Vronay, Petaluma, all of Calif.

[73] Assignee: Apple Computer, Inc., Cupertino, Calif.

[21] Appl. No.: 551,195

[22] Filed: Oct. 31, 1995

[51] Int. Cl.[6] .................................................. G06F 3/14
[52] U.S. Cl. ........................ 395/339; 395/333; 395/357
[58] Field of Search .................................. 395/155, 156, 395/159, 161, 700, 333, 334, 339, 348, 349, 357

[56] References Cited

U.S. PATENT DOCUMENTS

| | | | |
|---|---|---|---|
| 5,297,253 | 3/1994 | Meisel | 395/160 |
| 5,506,952 | 4/1996 | Choy et al. | 395/159 |
| 5,533,183 | 7/1996 | Henderson, Jr. et al. | 395/159 X |
| 5,539,870 | 7/1996 | Conrad et al. | 395/155 |
| 5,574,901 | 11/1996 | Takahashi | 395/601 |

Primary Examiner—Raymond J. Bayerl
Assistant Examiner—A. Katbab
Attorney, Agent, or Firm—Carr, DeFilippo & Ferrell LLP

[57] ABSTRACT

A system and method of using object sensitivity values and a cursor to select a graphical object from a plurality of graphical objects and sub-objects appearing on a display device. The plurality of graphical objects includes at least one container. A sensitivity value from the set of Normal, Opaque, Transparent, Invisible, Customized, and Automatic is designated for each of the objects. At authoring time, a sensitivity value from this set can be easily assigned to each of the objects, thus affecting the way hit testing proceeds over the objects. More particularly, an object is selected from the plurality of objects based on the position of the cursor, object position, object containment, and the sensitivity value of at least one of the objects.

23 Claims, 12 Drawing Sheets

Object A

| < Property > | < Value > |
|---|---|
| Height | 8.5 in |
| Width | 11.0 in |
| Color | R 13000<br>G 65000<br>B 65000 |
| Object Sensitivity | Transparent |
| ⋮ | ⋮ |
| Sub-object | B |

SYSTEM AND METHOD OF USING OBJECT SENSITIVITY FOR SELECTING COMPUTER-GENERATED OBJECTS

BACKGROUND OF THE INVENTION

1. Field of the Invention

This invention relates generally to computer-generated objects presented on a display. More particularly, the invention relates to an improved system and method of using object sensitivity to control hit testing of computer-generated objects and sub-objects. Still more particularly, the invention relates to a system and method for providing an author with a mechanism for controlling the way hit testing is performed.

2. Description of the Background Art

Software authoring systems provide computer programmers a set of development tools to aid in the creation of application programs. These tools include various objects that can be assembled into the usual parts of an application program, such as windows, menus, buttons, checkboxes, radio buttons, etc. The authoring system attempts to hide the low level details of an application program from an author by encapsulating the details in the objects and presenting instead a high level Application Program Interface (API) that makes the objects simple to understand and easy to use. One of the benefits of such Object-oriented authoring systems is the property of inheritance. That is, by using a toolbox object, such as a checkbox, certain functionality may be inherited, such as of checking itself (displaying a check mark inside the previously empty box).

After assembling the objects, an author adds additional functionality to selected objects, so that the object responds to a particular event with predetermined functionality. For example, when the checkbox receives a mouse-down operation, the checkbox checks itself and performs the predetermined functionality, such as displaying a document in "page view" format instead of "Normal" format. Hit testing is a the process by which the system determines which object is the target of a cursor-controlled hit, such as a mouse-down or "click" operation, while the cursor is over a particular object. For example, if mouse-down operation occurs while the cursor is over a graphical button, and the graphical button is within a graphical window, hit testing determines whether the graphical button or the window is thereby the target of the event. By controlling hit testing, authoring systems free the author from having to deal with low level programming of determining the target of events.

Previous authoring systems hide the low level details of hit testing by providing a single type of hit testing service, i.e. "Normal." "Normal" hit testing causes the computer system to select the most specific object over which the cursor is positioned. For example, a container contains a sub-object, and that sub-object contains a sub-object (i.e. a sub2-object). If the cursor is over the sub-object when a mouse-down operation is performed, the "Normal" response results in the selection of the sub-object. However, if the author does not want the sub-object to be selected, the author must abandon the convenience of the system to implement this function using more tedious low level programming. This use of low level programming to create a new hit testing scheme for selecting a different object when the mouse-down operation occurs over the sub-object is both time and labor intensive. Therefore, a system and method is needed that provides programmers with a more convenient way to customize hit testing methods.

SUMMARY OF THE INVENTION

The present invention overcomes the limitations and deficiencies previously described with a system and method of using object sensitivity to control the selection of an object from a plurality of computer-generated objects and sub-objects. The use of object sensitivity enables construction of a complex object as a composition of simpler objects, and enables containment to be the model for constructing the complex object.

The notion of object sensitivity allows authors to easily control how hit testing is executed on a plurality of objects. Object sensitivity provides a high level, easy to understand, object-oriented mechanism for customizing the hit testing characteristics of a program. By simply changing the object sensitivity value of an object, an author can control how the system treats the object for hit testing purposes, thereby achieving behaviors not possible in systems that provide hit testing services but do not allow customization.

The system has unique and distinct hit testing instructions for object sensitivity values including Normal, Opaque, Transparent, Invisible, Customized, and Automatic. Depending on cursor position, object position, object containment, and the object sensitivity value of at least one of the objects, the system selects an object as the target of a cursor-controlled hit. Once the system determines which object is the target of the event, a message is sent to the system, so that the system can appropriately respond to the event.

BRIEF DESCRIPTION OF THE DRAWINGS

FIG. 3 illustrates an example of the properties of an object appearing on the display of FIG. 1, in accordance with the present invention.

DETAILED DESCRIPTION OF THE PREFERRED EMBODIMENT

Figure 1:
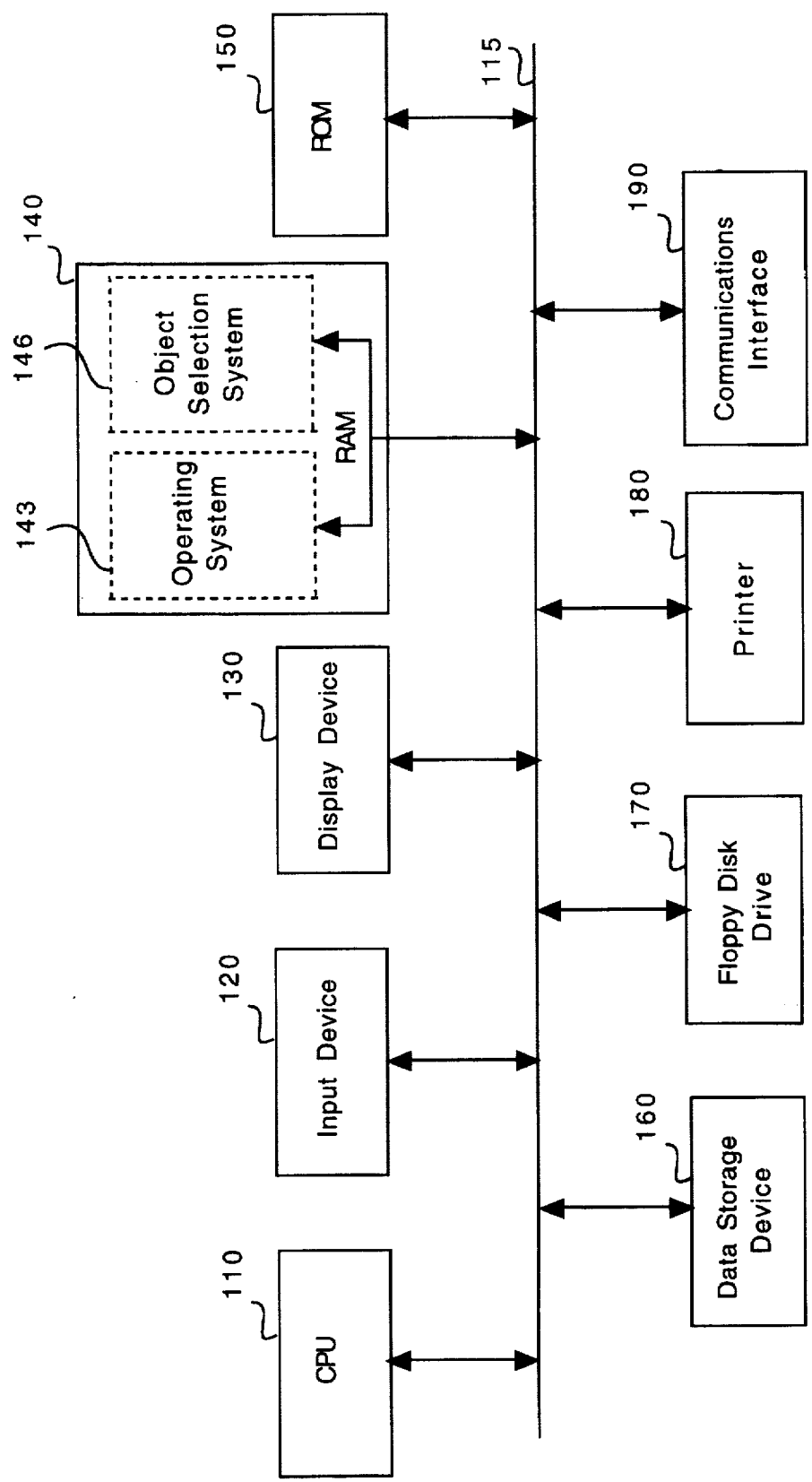
FIG. 1 is a block diagram of a computer system comprising an object selection system, in accordance with the present invention.

Referring now to FIG. 1, a block diagram is shown of a computer system 100 including a CPU 110. An input device 120 and a display device 130 are coupled to CPU 110. A Random Access Memory (RAM) 140, Read Only Memory (ROM) 150, and data storage device 160 are each coupled to CPU 110 via a data bus 115. RAM 140 stores an operating system 143, which is a program that controls the processing of CPU 110. Computer system 100 further comprises a floppy disk drive 170, a printer 180, and a communications interface 190, each coupled to CPU 110 via data bus 115. In the preferred embodiment, computer system 100 is a microprocessor-based personal computer, such as a Power Macintosh Computer manufactured by Apple Computer, Inc. of Cupertino, Calif. Operating system 143 is preferably System 7.5 for the Macintosh also by Apple Computer. Input device 120 is preferably a keyboard and mouse type controller, and display device 130 is preferably a video monitor. Input device 120 controls the position of a cursor appearing on display device 130.

In accordance with the present invention, RAM 140 stores an object selection system 146. Object selection system 146 is an application program that causes CPU 110 to select an object from a plurality of graphical objects appearing on display 130 based on cursor position and a sensitivity value of each object. Object selection system 146 may be stored in data storage device 160 and loaded into an allocated section of RAM 140 prior to execution by CPU 110. Floppy disk drive 170 enables the permanent storage of object selection system 146 on a removable storage medium for transport to other computer systems. Floppy disk drive 170 may also be used to initially load object selection system 146 into RAM 140.

Figure 2:
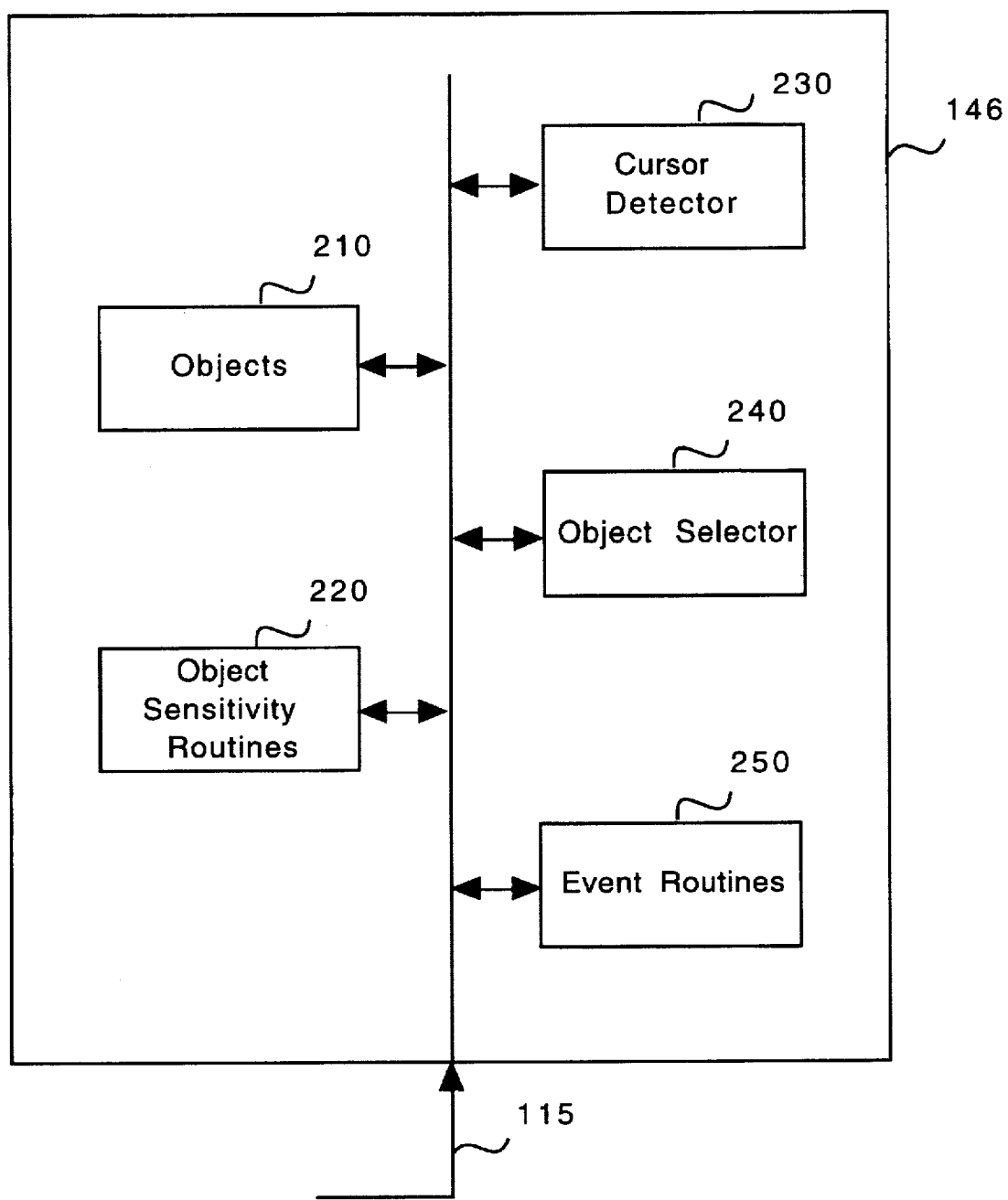
FIG. 2 is a block diagram illustrating the object selection system of FIG. 1, in accordance with the present invention.

Referring now to FIG. 2, a block diagram of object selection system 146 is shown. Object selection system 146 comprises sections of program code including objects 210, object sensitivity routines 220, cursor detector 230, object selector 240, and event routines 250. Objects 210 is data that contains the properties of graphical objects, or figures, appearing on display 130, and is stored in a section of RAM 140. The properties of each object include a height, width, color, font, position, etc. Objects 210 includes instructions to update the information on object A if the properties of object A are altered. Altering the properties of an object can be implemented by directly amending the program code, or by selecting and manipulating displayed object A using the cursor and pull-down menus, dragging techniques, etc.

In accordance with the present invention, objects 210 may include an object that contains sub-objects, wherein these sub-objects have sub-objects (hereinafter "sub2-objects"), and so on. In other words, a sub-object is an object contained within a container object (which may itself be a sub-object) and has its own properties. The order of which object contains which sub-object is referred to as object containment. The properties of a sub-object include graphical relationships with the container and other related sub-objects. Furthermore, the properties of an object include functionality. More particularly, the value for the functionality property identifies the event address of a particular event routine. Thus, when an object is selected, CPU 110 accesses the appropriate event routine at the event address identified by the functionality value, and performs the event routine.

In accordance with the present invention, objects 210 also includes for each object and sub-object an object sensitivity value. The object sensitivity value of the graphical objects on display 130 controls the way hit testing is performed by CPU 110. Hit testing is a program routine that, when executed by CPU 110, determines which object is the target of a cursor-controlled hit. A cursor-controlled hit is a signal from input device 120 that instructs CPU 110 to determine the position of the cursor and the position of the objects on display 130. A cursor-controlled hit may be (but not limited to) a mouse-down operation (i.e. the mouse button is depressed), a mouse-up operation (the mouse button is released), a mouse-enter (i.e. the cursor has graphically entered a region on the window), a mouse-leave (i.e. the cursor has graphically left a region on the window), a click (i.e. the mouse button is depresses and quickly released), and double-click (i.e. the mouse button is twice depressed and quickly released).

Object sensitivity routines 220 includes the hit testing instructions of the present invention. Object sensitivity routines 220 bases the selection of an object on cursor position, the positions of the objects, object containment, and the sensitivity value of each of the objects. The sensitivity value of an object points to the appropriate hit testing instructions contained in routines 220. For example, if a cursor is over a particular sub-object when a cursor-controlled hit is performed, CPU 110 accesses object sensitivity routines 220 based on the object sensitivity values to retrieve the appropriate hit testing instructions to determine which object is thereby selected.

Object sensitivity routines 220 contains the hit testing instructions for object sensitivity values including Normal, Opaque, Transparent, Invisible, Customized, and Automatic. Normal sensitivity is the default value for all graphical objects. The normal sensitivity routine causes CPU 110 to select the hierarchically deepest, most specific sub-object as the target of the cursor-controlled hit. For example, when applying the instructions for Normal sensitivity, CPU 110 determines if the cursor is over a container. If so, CPU 110 determines if the cursor is over a sub-object of that container, and so on. CPU 110 performs these steps until it determines the hierarchically deepest sub-object over which the cursor is positioned. CPU 110 selects that object as the target of the cursor-controlled hit. After an object is selected, the system reacts to the selection by invoking the appropriate event function, such as starting an application program or printing a particular document.

The Opaque sensitivity routine causes CPU 110 to ignore the sub-objects of an Opaque sensitive container when determining the target of a cursor-controlled hit. For example, if a cursor-controlled hit is performed while the cursor is over a sub-object and the sub-object is contained in an Opaque sensitive container, CPU 110 ignores the sub-object and selects the container as the target of the hit.

The Transparent sensitivity routine causes CPU 110 to disable the selection of a Transparent sensitive container, but enables CPU 110 to select one of its sub-objects as the target of a cursor-controlled hit. For example, if a cursor-controlled hit is performed while the cursor is over a Normal sensitive sub-object, and the sub-object is contained within a Transparent sensitive container, CPU 110 selects the sub-object. However, if the cursor is over the container, and not over the sub-object, CPU 110 looks for an object that contains the container.

The Invisible sensitivity routine causes CPU 110 to disable the selection of an Invisible sensitive container and all of its sub-objects. Thus, the container and its sub-objects can never be the target of a cursor-controlled hit. It will be appreciated that Invisible sensitive objects are for visual purposes only, and not for event purposes.

The Custom sensitivity routine causes CPU 110 to select an object according to the Normal sensitivity routine, so long as some arbitrary condition is satisfied. For example, an author may program a custom sensitive object to be hit only on Tuesdays. Thus, on Tuesday, selection of the object initiates a preprogrammed event, such as providing special characteristics to a calendaring routine. Custom sensitivity provides great flexibility for imaginative authors.

The Automatic sensitivity routine causes CPU 110 to select an object based on information it retrieves from the object over which the cursor is positioned when the cursor-controlled hit is performed. If an Automatic sensitive container is hit, the object may instruct CPU 110 to select any object on the display 130.

Cursor detector 230 causes CPU 110 to retrieve the position of the cursor appearing on display device 130 at the time of a cursor-controlled hit. More particularly, cursor detector 230 tracks the position of the cursor using conventional techniques, and stores the position of the cursor at the time of the cursor-controlled hit. In the preferred embodiment, the cursor is controlled by a mouse, and a cursor-controlled hit is a mouse-down operation.

Object selector 240 enables CPU 110 to determine which object is the target of a cursor-controlled hit. Object selector 240 recognizes the sensitivity value of each object, and thus retrieves the stored hit testing data required to execute object sensitivity routine 220. Since object sensitivity routines 220 require cursor position, object positions, and object containment, object selector 240 retrieves this information from the appropriate memory locations in RAM 140 in order to process the cursor-controlled hit. Object selector 240 accesses memory 140 storing objects 210 to retrieve data on the position of the objects and sub-objects, and data on object containment. Object selector 240 determines if the cursor is positioned over a container. If so, object selector 240 retrieves the sensitivity value of the container, and jumps to the appropriate object sensitivity routine 220. If instructed by the routine 220, object selector 240 determines if the cursor is positioned over a sub-object contained within the container. Object selector 240 continues this process until an object is selected. Examples for processing a cursor-controlled hit based on the object sensitivity values are described in more detail with reference to FIGS. 4–8.

Event routines 250 is a stored sequence of programmed instructions which causes CPU 110 to attach an event address to an object 210, and causes CPU 110 upon selection of the object 210 to perform an event routine, or functionality, contained at the event address. Thus, upon selection of the object 210, CPU 110 jumps to the event address and performs the corresponding event routine.

Referring now to FIG. 3, an exemplary map illustrating the properties of object A as contained in objects 210 is shown. The properties of object A include height, width, color, object sensitivity, and a sub-object. Each property of object A has a corresponding value. More particularly, object A has a height of 8.5 inches, a width of 11.0 inches, a turquoise blue color (defined by the spectral coordinates: R=13000, G=65000, and B=65000), Transparent sensitivity, and contains sub-object B. The properties of sub-object B are contained in a separate stack (not shown), wherein the value "B" illustrated in FIG. 3 identifies the address location of the separate stack. Object A may include other properties, such as borders and other sub-objects.

Because objects 210 contains instructions to update information on object A, direct object-oriented manipulation of object A automatically updates the stack. For example, the value for width can be re-set to 10.0 inches by selecting the object and dragging the object to a width of 10 inches which automatically sets the width value of object A to 10.0 inches. Object-oriented manipulation of a graphical object and the automatic updating of object values are well-known techniques in the software art. Otherwise, the values for width can be changed within the program itself (i.e. using an instruction such as "set A, width:=10.0 inches").

Figure 4:
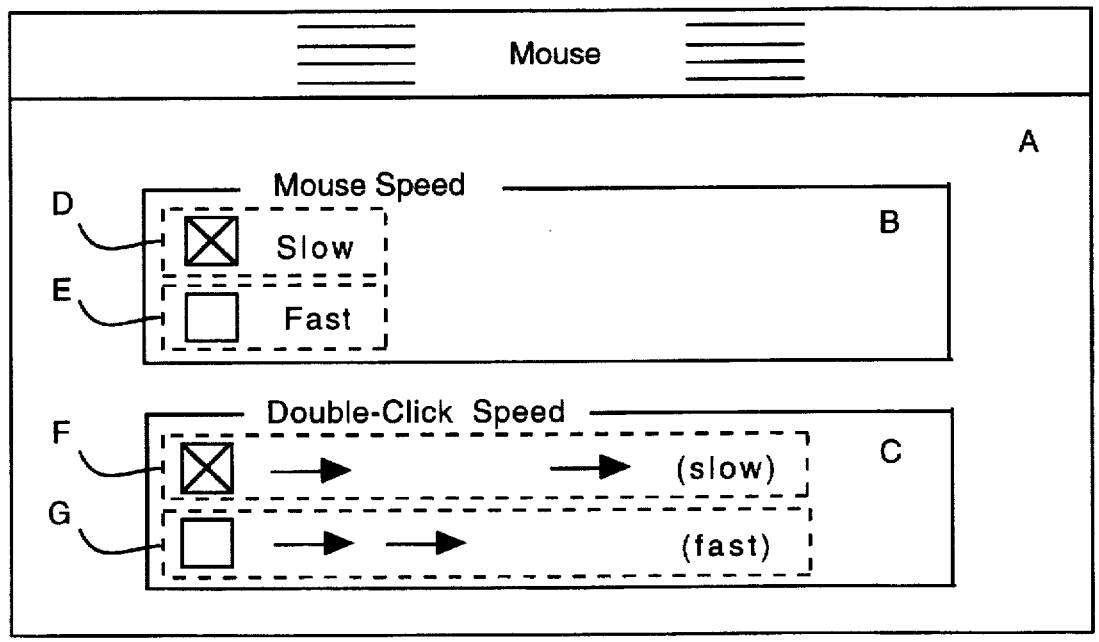
FIG. 4 illustrates an example of a composite object appearing on a display, in accordance with the present invention.

Referring now to FIG. 4, a displayed container having a plurality of sub-objects B–G is illustrated. In this embodiment, objects 210 includes container A. Container A has sub-objects B and C, wherein sub-object B has sub2-objects D and E, and sub-object C has sub2-objects F and G. More particularly, container A is an exemplary window for defining the characteristics of a mouse. Objects 210 stores the properties of object A, including the proportions of the window and the appropriate events to perform if object selector 240 selects a particular object or sub-object of object A. Object B is a figure for containing and displaying information (i.e. "a container") on mouse speed, and includes checkboxes D and E for selecting "slow" or "fast" mouse speed, respectively. Object C is a container for displaying information on double-click speed, and includes checkboxes F and G for selecting "slow" or "fast" double-click speed, respectively.

For example, if object selector 240 selects checkbox E, event routines 250 causes display device 130 to remove the check from checkbox D and place a check in checkbox E. Furthermore, event routines 250 causes CPU 110 to speed up the mouse, which is implemented using conventional mouse driver techniques. In another example, if object selector 240 selects object A, event routines 250 causes display device 130 to present a list of optional program steps to perform, such as adding or removing a sub-object container.

Figure 5:
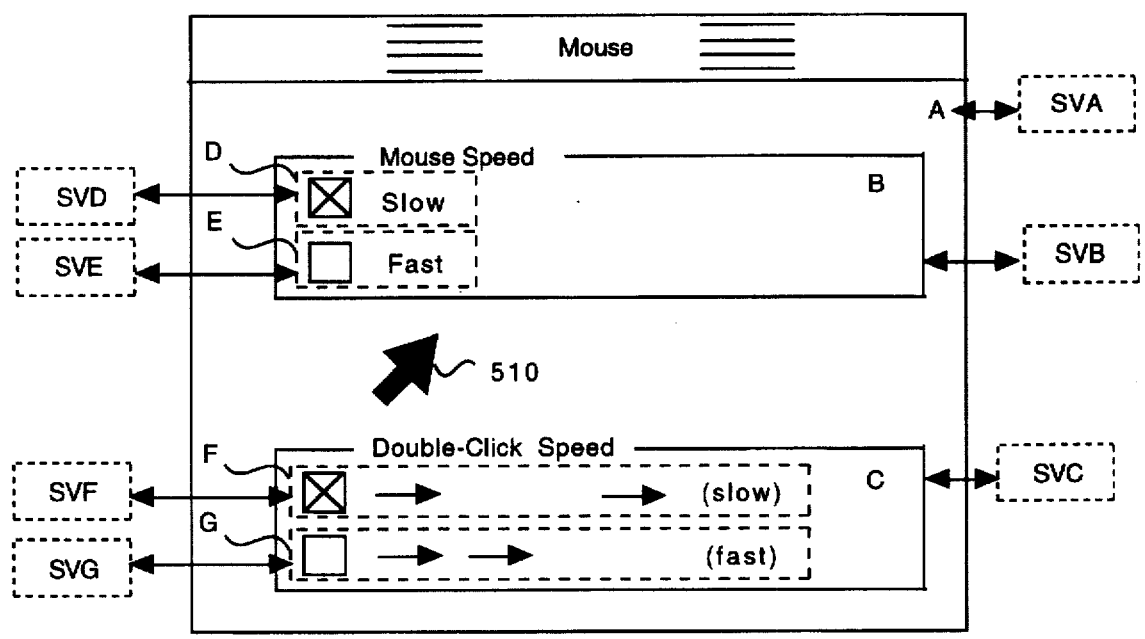
FIG. 5 illustrates the object of FIG. 4 having object sensitivity values, in accordance with the present invention.

Referring now to FIG. 5, displayed objects A–G and their sensitivity values SVA-SVG are illustrated. Object A is the same exemplary window illustrated in FIG. 4, and has the same sub-objects B–G, and same object containment. Object A has object sensitivity SVA. Object B has object sensitivity SVB. Object C has object sensitivity SVC. Object D has object sensitivity SVD. Object E has object sensitivity SVE. Object F has object sensitivity SVF. And, object G has object sensitivity SVG. In this example, cursor 510 is depicted as an arrow, and is controlled by a mouse-type input device 120.

In a first embodiment, the object sensitivity value of each object is set to Normal, and object selector 240 selects the deepest, most specific object as the target of a mouse-down operation. For example, if cursor 510 is positioned over object B when a mouse-down operation is performed, object selector 240 selects object B as the target. More particularly, object selector 240 determines if cursor 510 is over object A. Since cursor 510 is over object A and object A is Normal, object selector 240 determines that object A has sub-objects B and C. Object selector 240 determines that cursor 510 is over sub-object B, and thus determines if cursor 510 is over sub2-objects D and E. Since cursor 510 is not over D or E, object selector 240 selects object B. It will be appreciated that objects get considered from front to back, i.e. each object has a layer associated to it that corresponds to the order in which they were added to the containers. The layer of an object can be changed dynamically.

In a second embodiment, SVA alone is set to Transparent sensitivity. Thus, object selector 240 cannot select object A, but can select sub-objects B, C, D, E, F or G. For example, if cursor 510 is over object C when a mouse-down operation is performed, object selector 240 selects object C. More particularly, object selector 240 determines that cursor 510 is over object A, and that object A is Transparent sensitive. Object selector 240 then determines that object A has sub-objects B and C, and that cursor 510 is not over object B but is over object C. Object selector 240 then determines that object C is Normal, has sub2-objects F and G, and that cursor 510 is not over sub2-object F or G. Thus, object selector 240 selects object C.

In yet a third embodiment, SVA, SVB and SVC are set to Transparent sensitive. Thus, object selector 240 can select only sub2-objects D, E, F and G. For example, if cursor 510 is positioned over object D when a mouse-down operation is performed, object selector 240 selects object D. If cursor 510 is positioned over object B, but not over D, E, F, or G, when a mouse-down operation is performed, nothing is selected. More particularly, object selector 240 operates in a similar manner described above with reference to the first and second embodiments.

Figure 6:
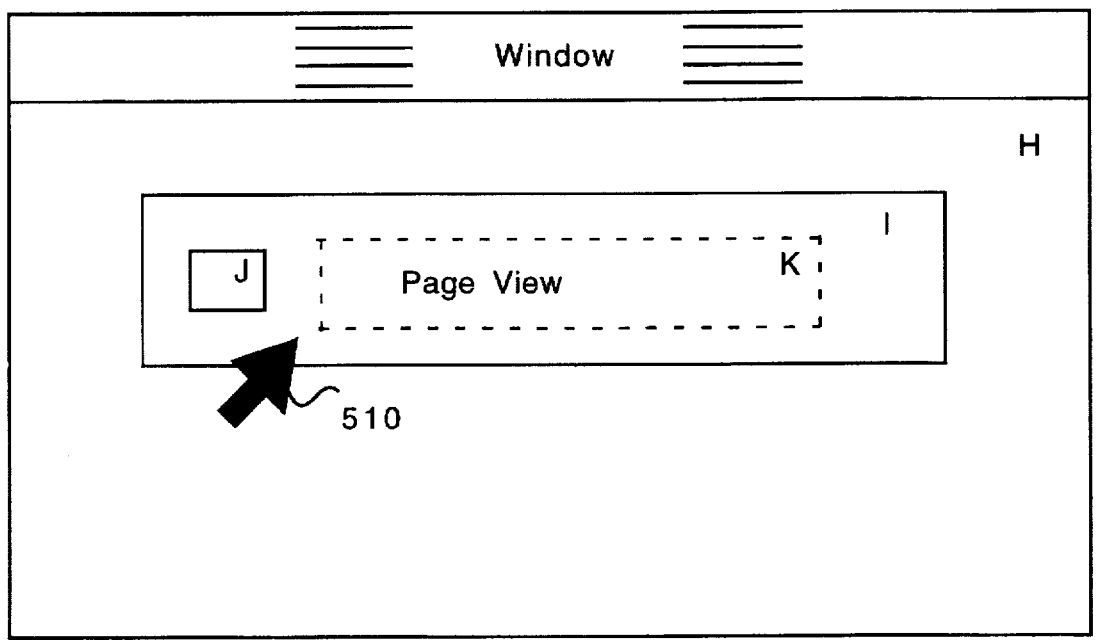
FIG. 6 illustrates a second composite object appearing on a display, in accordance with the present invention.

Referring now to FIG. 6, displayed exemplary window H is shown. Exemplary window H includes sub-object I, and sub2-objects J and K. Object I is a container for displaying information on whether a document is being displayed in "page view" format. Object J is a checkbox for toggling the page view format active and inactive. Object K is text stating that particular checkbox J toggles the characteristic for "page view."

In a first embodiment, all objects H–K are set to Normal sensitivity. Thus, as stated above, when the cursor-controlled hit is performed, object selector 240 selects the deepest, most specific object over which cursor 510 is positioned. For example, if cursor 510 is over object K when a cursor-controlled hit is performed, object selector 240 selects object K.

In a second embodiment, object H is set to Transparent sensitivity, and object I is set to Opaque sensitivity. Thus, because object H is Transparent sensitive, object selector 240 cannot select object H. Because object I is Opaque sensitive, a cursor-controlled hit while cursor 510 is over any part of object I, including over sub-objects J and K, causes object selector 240 to select object I. For example, if cursor 510 is over object K, object selector 240 selects object I. More particularly, object selector 240 determines that cursor 510 is over object H, determines that object H is Transparent sensitive, and determines that object H has sub-object I. Object selector 240 then determines that cursor 510 is over sub-object I, and determines that object I is Opaque sensitive. Thus, object selector 240 stops its examination and selects object I. In this embodiment, event routines 250 recognizes the selection of object I, causes display device 130 to place a check in checkbox J, and causes display device 130 to present the opened document in "page view" format.

Figure 7:
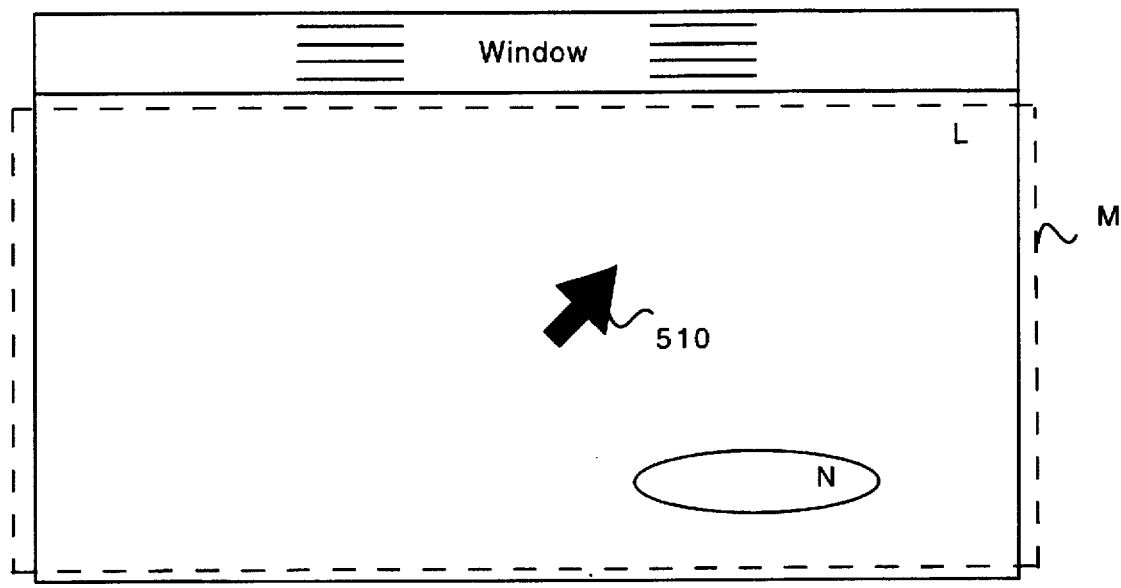
FIG. 7 illustrates a third composite object appearing on a display, in accordance with the present invention.

Referring now to FIG. 7, displayed object L is shown. Object L contains sub-objects M and N. It is important to note that object M and N are siblings. Since they both have the same container. Object M is a translucent object appearing as a layer over object L. Object N is a graphical button contained in object L that, when selected, initiates an event, such as opening a calendar window.

In a first embodiment, object L is set to Transparent sensitivity, object M is set to Customized sensitivity, and object N is set to Normal sensitivity. The arbitrary criteria of object M makes object M available for selection only if the day is Tuesday. Thus, if a cursor-controlled hit is performed on Monday while cursor 510 is over objects M and N, object selector 240 selects object N, and event routines 250 initiates opening the calendar window. More particularly, object selector 240 determines that cursor 510 is over object L, that object L is Transparent sensitive, that object L has sub-objects M and N, that cursor 510 is over Customized sub-object M. Object selector 240 then determines that the arbitrary criteria have not been met. Therefore, object selector 240 examines the sibling object, object N. Since the cursor 510 is over Normal object N, object N is selected. However, if a cursor-controlled hit is performed on Tuesday while cursor 510 is over objects M and N, object selector 240 determines that the arbitrary criteria of Customized object M have been met, and thus selects object M without testing object N. Object M is tested first only because it is in front of object N, i.e. it is listed in objects 210 first.

In a second embodiment, object M is set to Invisible sensitivity, and thus provides only screen color. Because object M is Invisible for event purposes, object M will not adversely effect system functions, since object selector 240 will still test the sibling objects, including object N.

Figure 8:
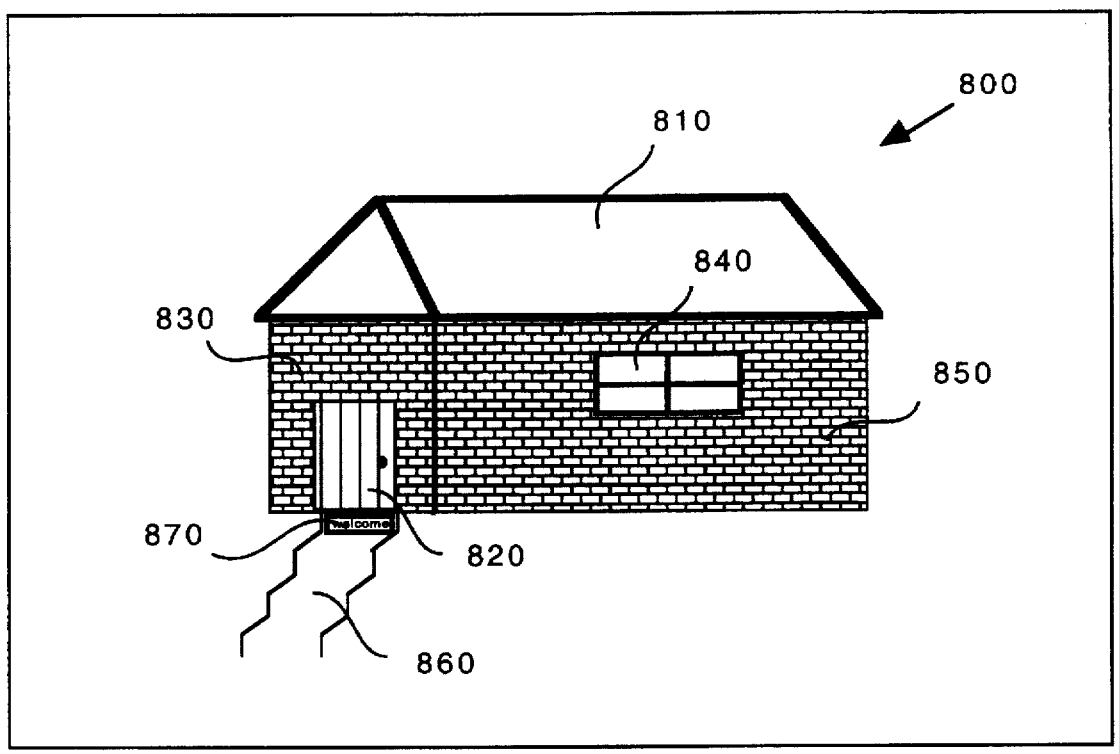
FIG. 8 illustrates a fourth composite object appearing on a display, in accordance with the present invention.

Referring now to FIG. 8, a graphical illustration of a house 800 appearing on display device 130 is shown. The more complex illustration is designed as a function of simpler objects and sub-objects. The house 800 comprises objects including a roof 810, a door 820, a door wall 830, a window 840, a window wall 850, a pathway 860, and a welcome mat 870. In one embodiment, the house 800 is set to Automatic sensitivity, and all its sub-objects are set to Normal sensitivity. Thus, so long as cursor 510 is positioned over the house 800 when a cursor-controlled hit is performed, object selector 240 selects an object based on information contained in the house 800. For example, the house 800 may first select the door 820, and event routines 250 may open the door 820. As an alternative, the house 800 may first select the window 840, and event routines 250 may display a person (not shown) waving through the window 840. Based on the information contained in properties of the house 800, object selector 240 selects an object of the house 800, and event routines 250 performs an appropriate event routine.

Figure 9:
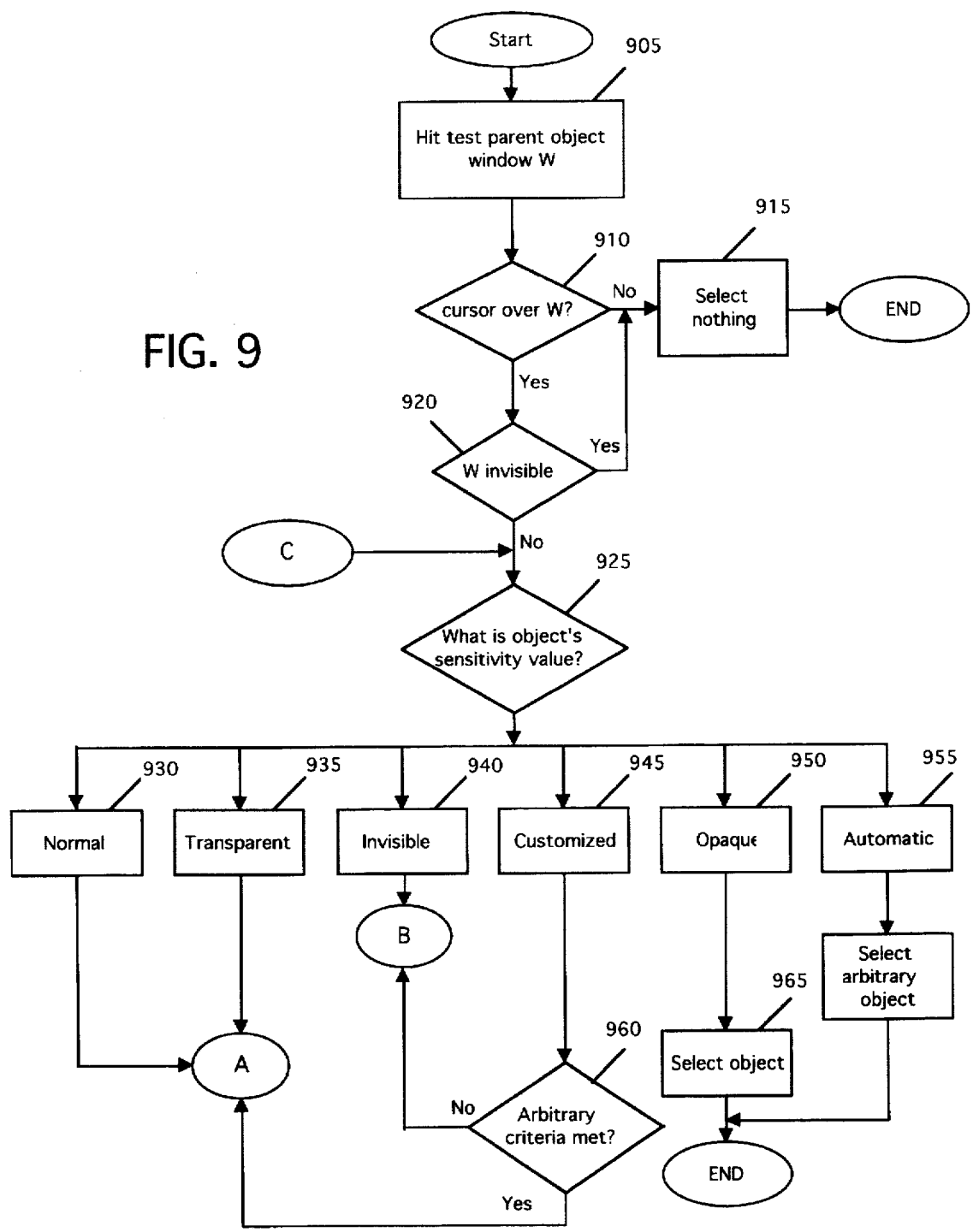
FIGS. 9–12 are a flowchart illustrating the preferred method for selecting an object using object sensitivity values, in accordance with the present invention.
Figure 10:
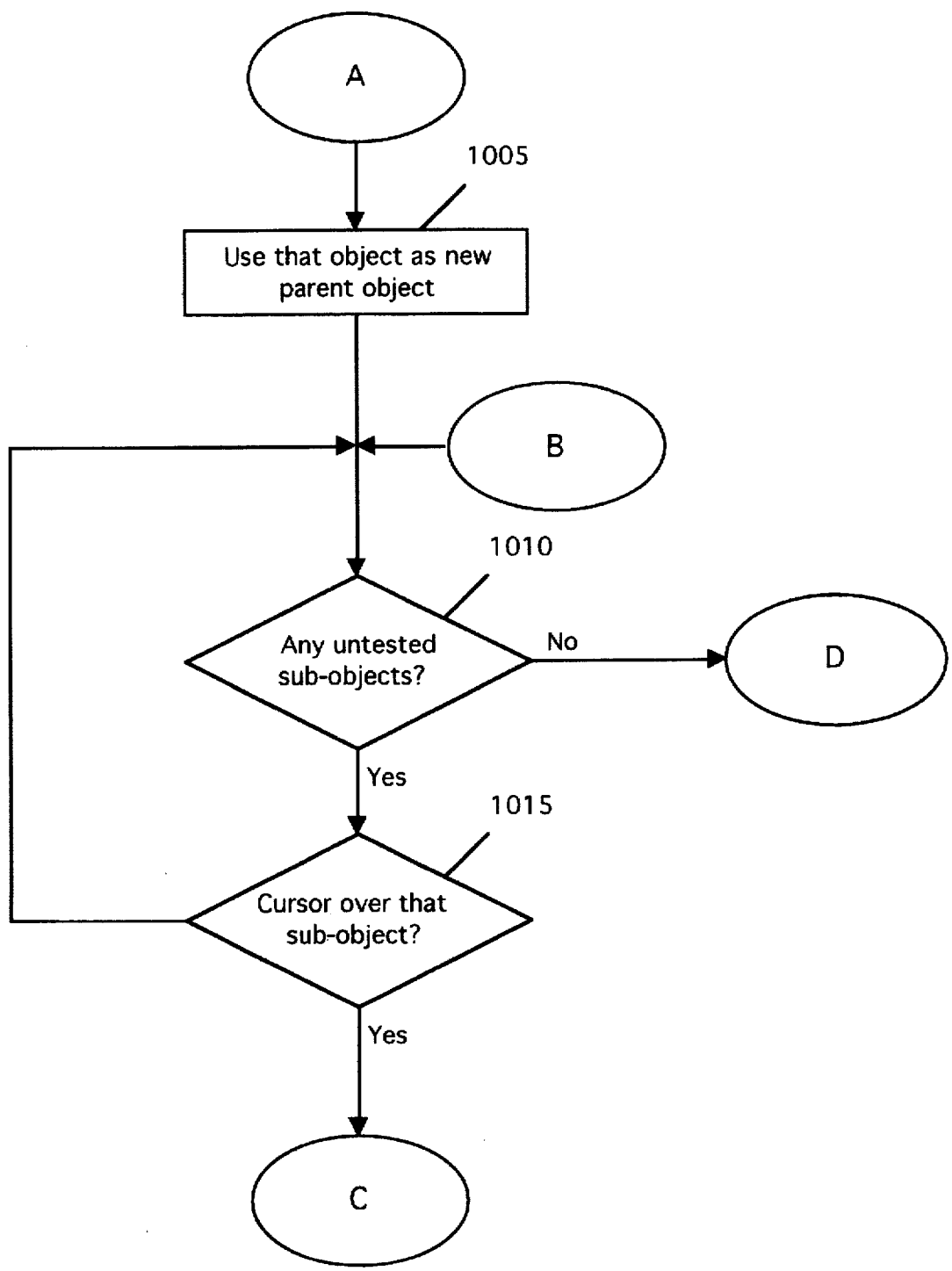
Figure 11:
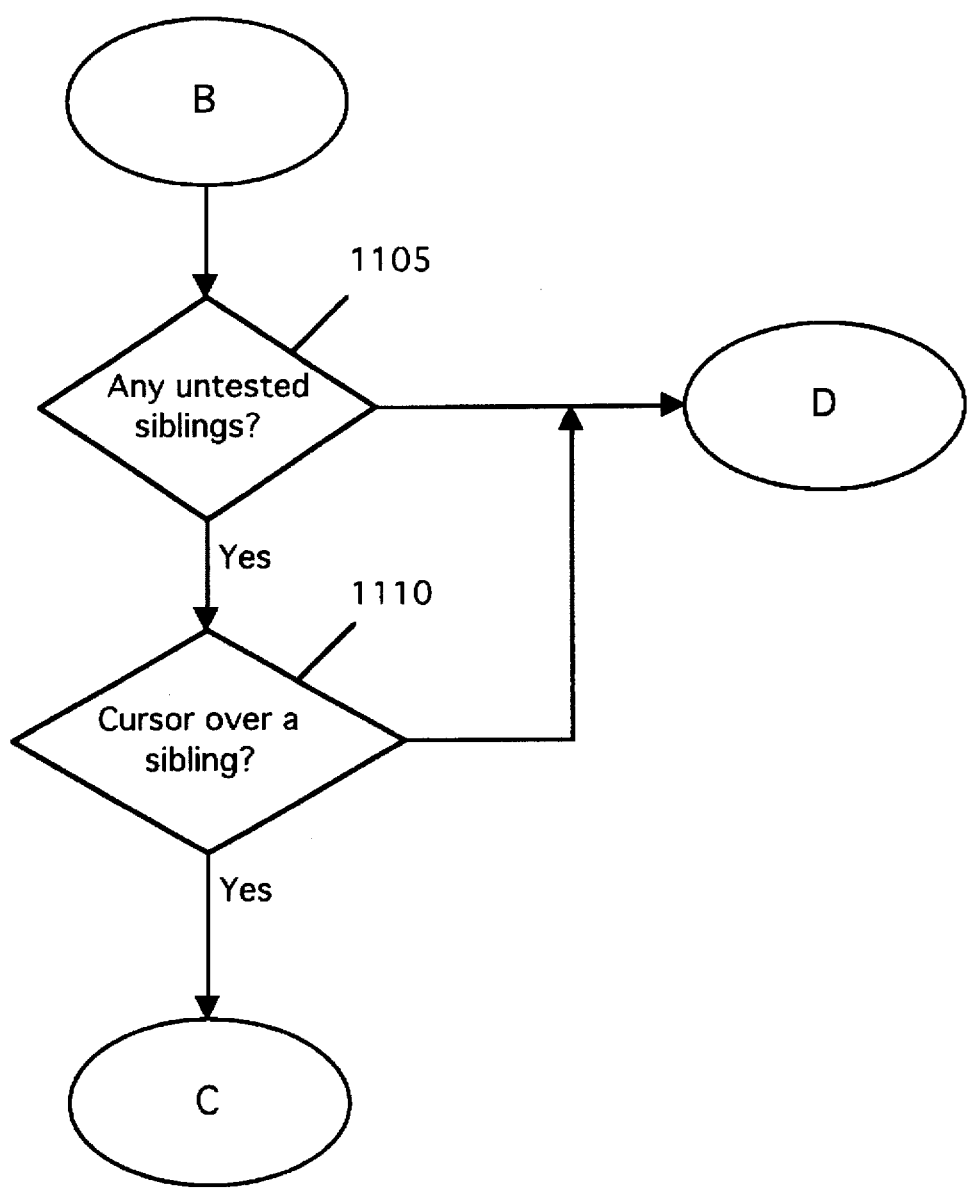

Referring now to FIGS. 9–11, a flowchart is shown illustrating the preferred method for selecting an object based on a cursor position and object sensitivity values. The method starts by hit testing 905 the container window W. Hit testing 905 the container W includes the steps of retrieving the position of objects appearing in the object window W, and the order of containment of those objects. As illustrated in block 910, the method continues by determining if the cursor is positioned over the container W. If the cursor is not positioned over the container W, then nothing is selected 915 and the method ends. As illustrated in block 920, if the cursor is over the container, then the sensitivity of the container W is tested to determine if it is Invisible sensitive. If the container W is Invisible sensitive, then nothing is selected 915, and the method ends. As illustrated in block 925, depending on the sensitivity value of object W, various steps are performed.

As illustrated in block 930, if the sensitivity value of the container W is Normal sensitive, then using 1005 object W as a container, the method determines if object W contains any sub-objects, as illustrated in block 1010. As illustrated in block 1015, the position of the cursor is then examined to determine if it is positioned over one of the sub-objects. If the cursor is positioned over a sub-object, then the method returns to block 925 to examine the object sensitivity of the sub-object. If the container W does not contain any sub-objects or the cursor is not positioned over a sub-object contained in the container W, then the method continues with step 1205 of determining if the container W is Transparent sensitive. When the container is Normal, container W is selected 1210, and the method ends.

As illustrated in block 935, if the sensitivity value of the container W is Transparent sensitive, then the method is the same as described above with reference to Normal sensitive object W. However, if the transparent sensitive container contains no sub-objects, then the object W is examined 1215 to determine if the container is contained within a container. When the container is not in a container, nothing is selected 1220 and the method ends. If container W were in a container, and the container is not Transparent sensitive, as illustrated in block 1225, then the container is selected as the target object, and the method ends.

As illustrated in block 940, if the sensitivity value of the container W is Invisible sensitive, then the method continues by determining if any untested siblings of the container W exist as illustrated in block 1105. If an untested sibling does exist, then the position of the cursor is examined to determine if it is positioned over the container W, as illustrated in block 1110. If the cursor is positioned over a sibling, then the method returns to block 925 to determine the sensitivity value of the sibling. If there are no untested siblings, or the cursor is not over a sibling, then the method continues (in FIG. 2) as described above with reference to Normal sensitive object W.

As illustrated in block 945, if the sensitivity value of the container W is Customized sensitive, then the method continues by determining if arbitrary criteria have been met, as illustrated in block 960. Arbitrary criteria may be a condition such as whether the day of the week is Tuesday. If the arbitrary criteria have been met, then the method continues in block 1005, as described with reference to Normal sensitive object W. However, if the arbitrary criteria have not been met, then the method continues in block 1105, as described with reference to Invisible sensitive object W.

As illustrated in block 950, if the object sensitivity value of the Container W is Opaque sensitive, then object W is selected 965, and the method ends.

As illustrated in block 955, if the object sensitivity value of the container W is Automatic sensitive, then an arbitrary object is selected 970, and the method ends.

Figure 12:
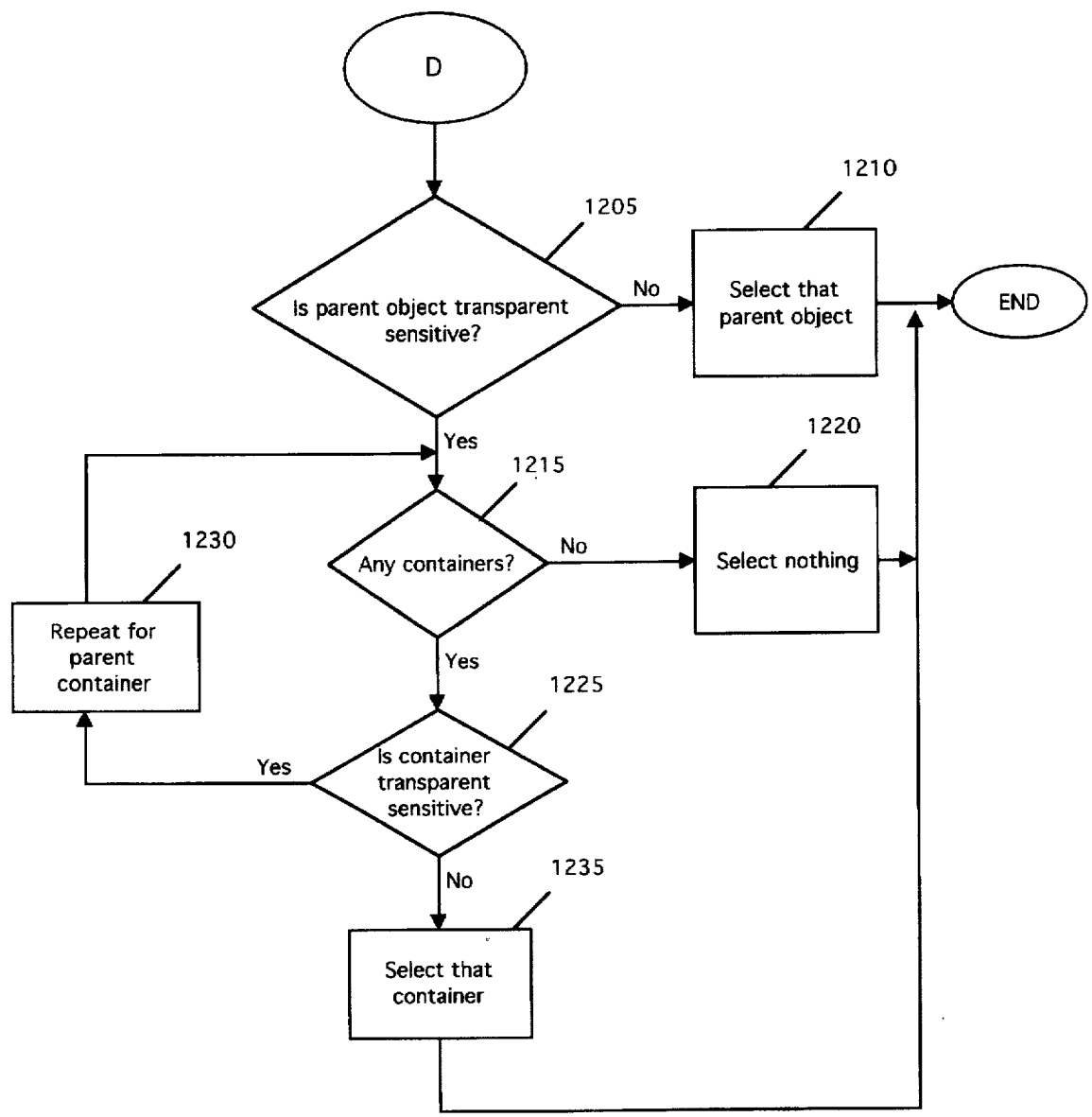

As a special case, if cursor 510 is over, for example, a Transparent sensitive sub2-object, with no sub3-objects, and having a Normal sensitive container and a Transparent sensitive sub-object, hit testing should yield the container as the target of the hit. FIG. 12 illustrates the method for retracing back through the containers to select the appropriate container as the target of the hit. After the deepest object hit is recognized as Transparent sensitive (i.e. from block 1010 or block 1105). The container is tested for Transparent sensitivity in block 1205. The method continues through the containers until a non-Transparent sensitive object is located. That container is selected 1235, and the method ends. If the method continues until no containers are left, then nothing is selected 1220, and the method ends. In the above example, the method would continue through the sub-object, and select the Normal sensitive container.

These and other variations of the preferred and alternate embodiments and methods are provided by the present invention. For example, the object selector may be implemented in hardware instead of a program executed by the CPU. Also, the object selection system can be stored in ROM, data storage device, etc. or implemented in hardware. The embodiments described have been presented for purposes of illustration and are not intended to be exhaustive or limiting, and many variations and modifications are possible in light of the foregoing teaching. The system is limited only by the following claims.

What is claimed is:

1. A computer-based method comprising the steps of:
   presenting on a display device a plurality of graphical objects having an order of containment;
   designating a sensitivity value for each of the objects;
   determining the position of a cursor on the display device; and
   enabling selection of an object from the plurality of objects based on the position of the cursor, the order of containment and the sensitivity value of at least one of the objects.

2. The method of claim 1, further comprising, after the step of determining the position of a cursor and before the step of enabling selection of an object, the step of recognizing a cursor-controlled hit that indicates the moment to determine cursor position.

3. The method of claim 1, wherein the sensitivity value of each of the objects is selected from the group including Normal, Transparent, Opaque, Invisible, Customized, and Automatic.

4. The method of claim 1, further comprising the step of selecting an object by examining the objects in the order of containment.

5. The method of claim 4, wherein the step of selecting an object comprises, if the sensitivity value of the object is Normal, the step of examining for sub-objects contained in the object to determine if the cursor is positioned over a sub-object.

6. The method of claim 4, wherein the step of selecting an object comprises, if the sensitivity value of the object is Transparent, the steps of disabling the selection of the object and examining for sub-objects contained in the object to determine if the cursor is positioned over a sub-object.

7. The method of claim 4, wherein the step of selecting an object comprises, if the sensitivity value of the object is Opaque, the step of selecting that object.

8. The method of claim 4, wherein the step of selecting an object comprises, if the sensitivity value of the object is Invisible, the step of disabling the selection of the object and any sub-objects.

9. The method of claim 4, wherein the step of selecting an object comprises, if the sensitivity value of the object is Customized, the step of determining if arbitrary criteria have been met, and if the criteria have been met the step of examining for sub-objects contained in the object to determine if the cursor is positioned over a sub-object.

10. The method of claim 4, wherein the step of selecting an object comprises, if the sensitivity value of the object is Automatic, the step of selecting an arbitrary object based on information retrieved from the object.

11. A computer-based system comprising:
   graphical objects, including at least one sub-object, having a containment order;
   a display device for displaying the graphical objects and a cursor;
   an input device for receiving data controlling the position of the cursor and a sensitivity value of each object; and
   an object selector program for selecting one of the graphical objects based on the cursor position, the containment order and the sensitivity value of at least one of the graphical objects.

12. The system of claim 11, wherein the cursor position is generated by a mouse.

13. The system of claim 11, wherein the sensitivity value is selected from a group including Normal, Transparent, Opaque, Invisible, Customized, and Automatic.

14. The system of claim 13, wherein the graphical objects include a container, and the container includes a container sub-object.

15. The system of claim 14, wherein the sensitivity values of the container and the sub-object are Normal, thereby enabling the object selector program to select the most specific object over which the cursor is positioned at the time of a cursor-controlled hit.

16. The system of claim 14, wherein the sensitivity value of the container is Opaque and the sensitivity value of the sub-object is Normal, thereby enabling the object selector program to select the container if the cursor is over any portion of the container at the time of a cursor-controlled hit.

17. The system of claim 14, wherein the sensitivity value of the container is Transparent and the sensitivity value of the sub-object is Normal, thereby disabling the object selector program from selecting the container, but not the sub-object.

18. The system of claim 14, wherein the sensitivity value of the container is Invisible and the sensitivity value of the sub-object is Normal, thereby disabling the object selector program from selecting the container and the sub-object.

19. The system of claim 14, wherein the sensitivity value of the container is Customized and the sensitivity value of the sub-object is Normal, thereby enabling the object selector program to select the container if the cursor is over the container and predetermined criteria are satisfied at the time of a cursor-controlled hit.

20. The system of claim 14, wherein the sensitivity value of the container is Automatic and the sensitivity value of the sub-object is Normal, thereby enabling the object selector program to select an object based on information retrieved from the container if the cursor is over the container at the time of a cursor-controlled hit.

21. A computer-based system comprising:
 display means for presenting a cursor and a plurality of graphical objects having a order of containment;
 input device means for designating a sensitivity value for each of the objects and for manipulating the cursor to a position over one of the objects; and
 means for selecting an object from said plurality of objects based on the position of the cursor, the order of containment and the sensitivity value of at least one of the objects.

22. A program storage medium having a computer program stored therein for causing a computer with a memory to perform the steps of:
 presenting a plurality of graphical objects having an order of containment on a display device;
 designating a sensitivity value for each of the objects;
 determining the position of a cursor on the display device; and
 enabling selection of an object from said plurality of objects based on the position of the cursor, the order of containment and the sensitivity value of at least one of the objects.

23. A computer-based system comprising:
 means for presenting on a display device a plurality of graphical objects having an order of containment;
 means for designating a sensitivity value for each of the objects;
 means for determining the position of a cursor on the display device; and
 means for enabling selection of an object from the plurality of objects based on the position of the cursor, the order of containment and the sensitivity value of at least one of the objects.

* * * * *